United States Patent [19]

Kluger et al.

[11] Patent Number: 5,043,013
[45] Date of Patent: Aug. 27, 1991

[54] WASHABLE INK COMPOSITIONS

[75] Inventors: Edward W. Kluger, Pauline; Patrick D. Moore, Spartanburg; Judy A. Wagner, Taylors, all of S.C.

[73] Assignee: Milliken Research Corporation, Spartanburg, S.C.

[21] Appl. No.: 394,346

[22] Filed: Aug. 15, 1989

Related U.S. Application Data

[63] Continuation-in-part of Ser. No. 139,683, Dec. 30, 1987, abandoned.

[51] Int. Cl.$^5$ .............................................. C09D 11/02
[52] U.S. Cl. .......................................... 106/22; 106/20
[58] Field of Search .................................... 106/20, 22

[56] References Cited

U.S. PATENT DOCUMENTS

| 3,157,633 | 11/1984 | Kuhn | 260/200 |
|---|---|---|---|
| 4,167,510 | 9/1979 | Brendle | 260/174 |
| 4,284,729 | 8/1981 | Cross et al. | 521/115 |
| 4,508,570 | 4/1985 | Fujii et al. | 106/20 |
| 4,703,113 | 10/1987 | Baxter et al. | 534/796 |
| 4,738,721 | 4/1988 | Baxter et al. | 106/22 |
| 4,908,062 | 3/1990 | Balmforth et al. | 106/22 |

Primary Examiner—William R. Dixon, Jr.
Assistant Examiner—Helene Kelmanski
Attorney, Agent, or Firm—Timothy J. Monahan; H. William Petry

[57] ABSTRACT

A washable aqueous ink composition having a viscosity of from about 1.0 to about 6.0 centipoises and containing from about 10 to about 50% by weight of one or more polymeric colorants of the formula:

$$\{R_1[(RO)_a-Y]_b\}_c$$

wherein:
  X is a polar group such as sulfonic acids, sulfonic acid salts, sulfonamides, sulfonates or the like;
  R is alkylene; Y is H, alkanoyl, carbamoyl, or the like;
  $R_1$ is nitrogen, oxygen, sulfur, or a sulfur-containing divalent linking group;
  a is an integer of from six to about forty;
  b and c are each independently selected from one or two;
  d is an integer of from one to four; the product of (a) (b) (c) is an integer of from 6 to about 40;
  and CHROM is a chromophore such as nitro, nitroso, monoaxo, disazo and trisazo, diarylmethane, triarylmethane, xanthane, acridine, methine, thiazole, indamine, azine, oxazine, or anthraquinone, wherein the $(RO)_a$ moiety is bonded to a carbocyclic aromatic ring of the (CHROM) through $R_1$.

20 Claims, No Drawings

WASHABLE INK COMPOSITIONS

This application is a continuation-in-part application of U.S. patent application Ser. No. 07/139,683, filed Dec. 30, 1987, now abandoned.

The present invention relates to washable ink compositions. More particularly, the present invention relates to water-based ink compositions containing polyalkyleneoxy-substituted, polar group-substituted chromophore compounds having improved washability and stain resistance characteristics.

Washability and resistance to staining are characteristics that may be highly desirable in a wide variety of end use applications for inks, especially in applications designed for young children. Such applications may include, for instance, water colors, inks for "nib-type" pens as well as felt-type and wick markers, stamp pads, recording pens and a wide variety of other applications that will be readily apparent to those skilled in the art.

Conventional, water-based inks designed, for instance, for use in marker pens sold primarily for use by young children may typically consist of very fine pigment dispersions in aqueous media which may contain a minor amount of a solvent such as glycol, polyols, polyoxyethers, or other functionalized alcohols and a dispersing agent. Alternatively, such marking ink compositions may be comprised of conventional acid, e.g., dyes containing sulfonic acid groups or their corresponding salts, dyestuffs in an aqueous glycerine solution.

Such conventional ink compositions are characterized by certain serious disadvantages, especially where use by children is contemplated. Thus, such inks may stain the skin and clothing of the user and may not be easily removable using conventional procedures for washing hands or laundering clothing. Certain low molecular weight acid dyes may not be desirable for use in ink compositions since they are suspected carcinogens. Many of the solvents conventionally found in such ink compositions may also have an objectionable odor, and they may also be toxic, (upon inhalation or skin contact), and are therefore undesirable for use in inks for those reasons as well (see Polymers. Pain. Color Journal. Vol 177. No. 4192. 1987) Furthermore, many of the conventional ink compositions may not be stable upon storage because the pigment or dyestuff may precipitate from the ink composition with the passage of time.

Accordingly, the ink compositions of the present invention may overcome all or many of the disadvantages found in conventional ink compositions. In particular the ink compositions of the invention may exhibit improved resistance to staining of both skin and fabrics so that all, or virtually all of the colorant may be removed from skin by means of conventional soap and water washing and from clothing using normal laundering techniques. Furthermore, the ink compositions of the present invention may be less toxic to humans due to the relatively high molecular weight of the colorant and because other solvents may not necessarily be present in the ink compositions.

The ink compositions of the present invention exhibit excellent brilliance, intensity and clarity of color especially when used on paper substrates. In addition, the present ink compositions may be applied smoothly and uniformly of a typical writing or marking instrument onto a wide variety of substrate surfaces. Once applied to a given substrate the ink compositions are also not undesirably transferred from the intended substrate such as paper to other objects such as clothing or skin by, for instance sublimation as may occur with conventional inks even after drying because they contain lower molecular weight, more volatile colorants.

Accordingly, the present invention provides:

A washable ink composition which comprises an aqueous mixture of one or more polymeric colorants of the formula:

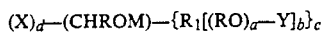

$$(X)_d\text{—(CHROM)—}\{R_1[(RO)_a\text{—Y}]_b\}_c$$

wherein:

X is a polar group selected from sulfonic acids, sulfonic acid salts, sulfonamides, sulfonates, carboxylic acids, carboxylic acid salts, carboxylic acid amides, carboxylic aldehydes, ureas, thioureas, nitro groups, hydroxy groups, polyethers, and hydroxyalkylethers;

R is unsubstituted or substituted straight or branched alkylene of 2-4 carbons, or mixtures thereof;

Y is selected from H, alkanoyl, aroyl, alkoxycarbonyl, unsubstituted or substituted carbamoyl, or —CH$_2$CH(R$_2$)—X;

$R_1$ is selected from nitrogen, oxygen, sulfur, or a sulfur-containing divalent linking group;

$R_2$ is hydrogen or a lower alkyl group containing one to about five carbon atoms;

a is an integer of from 6 to about 40;

b and c are each independently selected from one or two;

d is an integer of from one to four; the product of (a) (b) (c) is an integer of from 6 to about 40;

and CHROM is a chromophore selected from nitro, nitroso, monoazo, disazo and trisazo, diarylmethane, triarylmethane, xanthane, acridine, methine, thiazole, indamine, azine, oxazine, or anthraquinone, wherein the {RO}$_a$ moiety is bonded to a carbocyclic aromatic ring of the (CHROM) through $R_1$.

Colorants made of polyalkyleneoxy-substituted chromophores are known and have been disclosed as having utility, for instance as fugitive tints in coding fabrics of different types for identification purposes prior to textile processing.

Such compounds have, for instance, been disclosed in U.S Pat. No. 3,157,663 to Kuhn. While such colorants are water soluble and homogeneous, they are not suitable for washable ink compositions for several reasons. The corresponding colorants of Kuhn, as mentioned above, are used primarily to tint fabric substrates; therefore, they are usually of very high molecular weight units containing as many as 100 to 200 ethylene oxide units. Such compounds may be in a solid phase at standard temperatures and pressure and may have poor tinctorial properties (very low color strength). Since an aqueous ink composition requires water as the solvent for the polymeric colorant as well as any potential other additives, compositions as disclosed above require extremely high loadings of solid polymeric colorants to be dissolved in water. This inherent property leads to ink compositions of polymeric colorants with very little water and exceedingly high concentrations of polymeric colorants which in turn leads to ink compositions of unacceptably high working viscosities. In many cases, an ink composition cannot even be prepared with high enough color strength to be useful in the washable marker area of the present invention. The ink compositions of the present invention, by contrast contain colorants as defined above, such that the ink has high color strength and low solution viscosity (required in ink compositions) while maintaining its washability and non-staining characteristics. A viscosity of from 6 to about 1 centipoises is desirable. Preferably the viscosity may be less than about 5 centipoises. Viscosity is measured by a Model LVT Brookfield viscosimeter, UL adapter at 60 RPM's.

A typical preferred ink composition of the present invention is comprised of from about 40 percent by weight to about 80 percent by weight of water; from about 10 percent by weight to about 50 percent by weight of polymeric colorant containing a polar chromophore with from about 10 percent by weight to about 50 percent by weight of polyalkylene oxide units. The polymeric colorants selected for the washable ink compositions of the present invention contain from about 5 percent by weight to 40 percent by weight of polyalkylene oxide; wherein the alkylene oxide is preferably ethylene oxide.

In addition to the polyalkyleneoxy-substituted, polar group-substituted colorant component and water which serves as a solvent for the ink composition, a wide variety of additives may also be employed to impart specific properties to the ink composition in either the wet or dried state. Some common additives which may be present include, for example, organic components which are well known in the art and which function as humectants, biocides, and chelating agents.

Any humectant having water solubility can be used in the ink composition of this invention and where the composition is employed in a marker pen, for instance, it may serve to substantially prevent or minimize the marker tip from drying. Several examples of humectants commercially used are glycerine, diethylene glycol and polyethylene glycols, and sorbitol. The percent by weight of humectants can vary but typically 5 to about 20 percent by weight of the ink composition is used.

A biocide or bactericide can be added to improve shelf-life of the ink composition. Biocides which are particularly useful in the composition are Nuosept and both methyl and propyl parasepts. The biocide retards the growth of micro-organisms which may degrade the ink and can be eliminated if it is not necessary to inhibit the growth of bacteria. The biocide therefore adds to the shelf-life of the ink composition. In general, the percentage by weight of biocide can vary greatly depending on the chemical nature of biocide, however, from 0.02 to about 0.5 percent by weight have been found to be generally useful. Some commercially available biocides that can be utilized are as follows: Troysan Polyphase AF-1, Troysan 174, Troysan 142, Cosan 101, Amical 48, Tektamer 38 A.D., Dowicil 75, Metasol TK 100 Dispersion W, Omacide 50, Acticide APA, Domiphen Bromide, Benzalonium Chloride, Cetyl Pyridium Chloride, Kathon CG/ICP/886 MW 1.5% LX, Euxyl K100, and Glutaraldehyde.

Various chelating agents may be provided in the ink composition to improve shelf-life. Thus, for instance, EDTA is a chelating agent which complexes metal ions such as iron, zinc, magnesium, etc. and prevents the precipitation of these metal ions. The percentage by weight of metal chelating can vary greatly, however, generally from 0.1 to about 0.5 percent by weight of EDTA (sodium salt) on the weight of the total ink composition can be employed to prevent the formation of water insoluble carbonate salts when the ink compositions is exposed to ambient air which contains carbon dioxide.

Another aspect of shelf-life is the maintenance of the polyalkyleneoxy colorant and this is extended by maintaining the pH of the ink at some value close to about 7.0. The pH can go below about 6.5 without loss of activity. However, values of pH above 8.0 can severely degrade the colorant especially if elevated temperatures are involved. Accordingly, the pH of the ink composition is adjusted to from about 5.5 to about 8.0 and preferably from about 6.5 to about 7.5.

As mentioned above, the ink compositions of the present invention are characterized by significantly reduced staining of fabrics. Fabric staining may be determined by measuring the delta $E^*ab$ value of the residual colorant stain. This delta $E^*ab$ value is directly related to fabric staining after laundering. The numerical value of delta $E^*ab$ as is determined in this invention can vary from 0 to about 10; preferably from 0 to about 5.

In addition, the ink compositions also are characterized by significantly reduced staining of skin. Skin staining may be measured by rating the residual skin stain after washing the hands with soap and water. The numerical value for hand staining, on a scale of zero to ten, as determined in this invention can vary from 0 to about 2; preferably from 0 to about 1.

EXPERIMENTAL SECTION

The following examples serve to illustrate the subject matter of the present invention and are not to be construed as limiting the scope of the invention. All parts and percentages which are set forth are by weight unless otherwise indicated. The following abbreviations are used in the tables: Et=ethyl; Me=methyl; EO-=ethylene oxide unit; PO=propylene oxide; Ac=acetate; and DiAc - diacetate.

EXAMPLE 1

Forty-two grams of 70% sulfuric acid, 573.3 grams of aniline 27 EO diacetate, 7.6 grams of urea and 52 grams benzaldehyde-2-sulfonic acid sodium salt (77.7% active) were added to a 500 milliliter three necked flask equipped with a reflux condenser, thermometer, mechanical stirrer, and heating mantle. This reaction mixture was heated to 95° C. with the heating mantle and maintained at 95°-100° C. for three hours. After three hours, the reaction mixture was oxidized with 90 grams of 70% benzoyl peroxide controlling the exotherm below 110° C. The reaction mixture was heated for an additional three hours further at 95°-100° C. for three hours. After three hours, the reaction mixture was oxidized with 90 grams of 70% benzoyl peroxide controlling the exotherm below 110° C. The reaction mixture was heated for an additional three hours further at 95°-100° C.

The resulting reaction mixture was then cooled to room temperature and neutralized to a pH of 7 with 68.7 grams of sodium bicarbonate keeping the temperature below 25° C. This crude blue solution was used without further purification. The structure of this resultant compound is set forth in entry 1 of Table I. Entries 2-13 of Table 1 were also prepared using the same general procedure set forth above.

EXAMPLE 2

The procedure of Example 2 was followed with the exception of the amount of reactants and the particular aldehyde and polymer intermediate, and oxidizing agent employed, all of which are specified below:

663.3 grams of aniline 70 EO intermediate
663.3 grams of water
15.6 grams of 4-N,N-dimethylaminobenzaldehyde
21.0 grams of 70% sulfuric acid
2.4 grams of urea
28.0 grams of chloranil The resulting reaction mixture was then cooled to room temperature and neutralized with 27.2 grams of 50% sodium hydroxide to pH of 7.21 keeping the temperature below 25° C. This crude blue solution was used without further purification. The structure of this resultant compound is set forth in entry 1 of Table 2. Entries 2-6 of Table 2 were also prepared using the same general procedure set forth above.

EXAMPLE 3

Five hundred and forty-nine grams of 85% phosphoric acid, 75 grams of 98% sulfuric acid, and 9 drops of 2-ethyl hexanol defoamer were added to a 1000 milliliter three necked flask equipped with a thermometer, cooling bath, and mechanical stirrer. The mixture was cooled and 30.9 grams of 2-aminothiazole was added to the flask. The mixture was further cooled to below 0° C. after which 105 grams of 40% nitrosyl sulfuric acid were added while maintaining the temperature below 5° C. After three hours the mixture gave a positive nitrite test and 25 grams of sulfuric acid were added slowly keeping the temperature below 5° C. A negative nitrite test was evident after one further hour.

A 2000 milliliter beaker was charged with 333.6 grams of 10 EO aniline diacetate intermediate, 200 grams of water, 200 grams of ice and 12 grams of urea. This mixture was cooled to below 0° C. The diazo solution was added dropwise to the beaker over about 30 minutes, maintaining the temperature below 10° C. The resulting mixture was stirred for several hours and allowed to stand overnight, after which 780 grams of 50% sodium hydroxide was added to neutralize excess acid to a pH of about 7 keeping the temperature below 20° C. The bottom salt layer was removed and the product was dissolved in methylene chloride. The methylene chloride solution was washed four times with water and then dried over sodium sulfate. The methylene chloride solvent was then filtered and stripped to give an orange oil.

Two hundred grams of N,N-dimethylformamide, 128.8 grams of the orange liquid from above, 34.8 grams of bromoacetic acid, and 4.3 grams of sodium iodide were added to a 500 milliliter flask equipped with a reflux condenser, thermometer, heating mantle, and mechanical stirrer. This reaction mixture was heated to 50° C. with the heating mantle. The reaction temperature was maintained at 45°-50° C. for 20 hours. The reaction mixture was cooled and the contents were transferred to a 1000 milliliter round flask and stripped of solvent. The resulting crude product was pH adjusted with sodium hydroxide (25%) and was without further purification. The structure of this resultant compound is set forth in entry 1 of Table 3. Entry 2 of Table 3 was also prepared using the same general procedure set forth above.

EXAMPLE 4

Four hundred grams of acetic acid, 17.9 grams of Fisher's base, and 114.0 grams of p-formylaniline 20 EO diacetate intermediate, were charged into a 1000 milliliter three necked flask equipped with a reflux condenser, thermometer, heating mantle, and mechanical stirrer. This mixture was heated to 95° C. with the heating mantle and was maintained at 95°-100° C. for an additional six hours. The reaction mixture was cooled and transferred to a 1000 milliliter round bottom flask and stripped of acetic acid. The pH of the resulting product was adjusted with 25% sodium hydroxide to 7. The structure for this resultant compound is set forth in entry 1 of Table 4. Entry 2 of Table 4 was also prepared using the same general procedure set forth above.

EXAMPLE 5

One hundred and eighty-three grams of 85% phosphoric acid, 50 grams of 98% sulfuric acid, and 1 drop of 2-ethylhexanol defoamer were added to a 500 milliliter flask equipped with thermometer, mechanical stirrer, and cooling bath. The contents of this flask were cooled and 23.1 grams of 2-amino-6-benzothiazole sulfonic acid was added. The mixture was further cooled to below 0° C. after which 35 grams of 40% nitrosyl sulfuric acid were added while maintaining the temperature below 0° C. After three hours the mixture gave a positive nitrite test and 2 grams of sulfamic acid was added and a vacuum pulled. A negative nitrite test was evident after one hour further.

A 2000 milliliter beaker was charged with 97.3 grams of aniline 20 EO intermediate, 200 grams of ice-water, and 4 grams of urea. The diazo solution from the flask was added dropwise to the beaker over about 30 minutes, maintaining the temperature below 5° C. The resulting solution was stirred for several hours and allowed to stand overnight, after which 260 grams of 50% sodium hydroxide was added to neutralize the excess acid to pH of about 7. The resulting red product was then separated from the bottom salt layer and used without further purification. The structure of the resultant compound is set forth in entry 1 of Table 5. A wide variety of related compounds were prepared using the same general procedure set forth in example 5 and are represented by entries 2 through 9 of Table 5 and entries 1 through 4 of Table 6.

EXAMPLE 6

The procedure of Example 5 was followed with the exception of amounts of reactants and the particular diazo component and coupler employed, all of which are specified below:

210 grams of 70% sulfuric acid
430 grams of ice
1 drop of 2-ethylhexanol
77.5 grams of p-dihydroxyethylsulfonamidoaniline
150 grams of 40% nitrosyl sulfuric acid
21 grams of sulfamic acid
311 grams of m-toluidine 20 EO intermediate
300 grams of ice
300 grams of water
12 grams of urea The excess acid was neutralized with 1015 grams of 50% sodium hydroxide, the bottom salt layer of the reaction mixture was removed hot and the product separated and was without further purification. The structure of this resultant compound is set forth in entry 1 of Table 7. Entries 2 through 17 of Table 7 were also prepared using the same procedure set forth above.

EXAMPLE 7

One hundred fifty grams of toluene, 4.3 grams of cyanoacetic acid, and 61.4 grams of p-formylaniline 20 EO diacetate were charged into a 250 milliliter three necked flask equipped with thermometer, Dean Stark trap, reflux condenser, mechanical stirrer, and heating mantle. This reaction mixture was heated to reflux and the water that was generated condensed and collected in the trap. After four hours of refluxing, water stopped condensing in the trap indicating that the reaction was completed. The resulting mixture was cooled and transferred to a 1000 milliliter round bottom flask and stripped of toluene under vacuum. The crude resulting yellow liquid was used without further purification. The structure of this resultant compound is set forth in entry 1 of Table 8. Entries 2 through 5 of Table 8 were also prepared using the same general procedure set forth above.

EXAMPLE 8

Thirty-six grams of concentrated hydrochloric acid, 76 grams of ice, and 2 drops of 2-ethylhexanol defoamer were added to a 500 milliliter flask equipped with thermometer, mechanical stirrer, and cooling bath. The contents were of this flask were cooled and 71.4 grams of p-( 30 EO oxy)aniline intermediate (molecular weight of approximately 1428) were added. The mixture was further cooled to below 5° C. after which 3.5 grams of sodium nitrite dissolved in 8 grams of water were added to the flask maintaining the temperature below 5° C. The reaction mixture was allowed to react for three hours keeping maintaining a strongly positive nitrite test (by the periodic addition of 5 N sodium nitrite solution). After this three hour period, 1 gram of sulfamic acid was added and a vacuum pulled. A negative nitrite test was evident after one hour further.

A 2000 milliliter beaker was charged with 23.5 grams of 75% chromotropic acid sodium salt, and 59.3 grams of sequestrene 30 A (a 30% solution of EDTA tetrasodium salt adjusted to pH of 12.5 with sodium hydroxide). The diazo solution from the flask was added dropwise to the beaker over about 30 minutes, maintaining the temperature below 10° C. The resulting solution was stirred for several hours and then allowed to stand overnight, after which the pH was adjusted to about 7 with dilute sodium hydroxide and the bottom salt layer was separated from the product and the resulting violet product was used without further purification. The structure of the resultant compound is set forth in entry 1 of Table 9. A wide variety of related compounds were prepared using the same general procedure set forth in Example 8 and are represented by entires 2 through 5 of Table 9.

EXAMPLE 9

The color strength of both the polymeric colorants and inks were determined by the method described in this example.

First the color value (a term used to represent color strength) of the concentrated polymeric colorant being tested was determined by weighing about 0.10 to 0.15 grams of the colorant into a 100 milliliter volumetric flask that was first tared with an analytical balance and then adding 40 to 50 milliliters of water. The flask was swirled until the colorant dissolved in the water, after which excess water was added to the 100 milliliter mark on the flask. The flask was stopped and the contents were mixed and shaken. Exactly 2 milliliters of the colorant solution in water was then added to a like flask and the second flask was filled with water to the 100 milliliter mark, stopped and shaken.

A Beckman DU-7 spectrometer was zeroed with water in analyzing cell, and then filled with the test colorant solution prepared above. The solution was scanned from 300 to 700 nanometers. The maximum absorbance was recorded at the corresponding wavelength. The color value is obtained by multiplying the sample weight by 0.2 and then dividing this product into the maximum absorbance value.

$$CV(COLOR\ VALUE) = Absorbance/0.2 \times sample\ weight(grams)$$

Correcting for the color strength of the ink solution is done in order to obtain comparative data. In order to correct for the varying ink solutions a given weight of the uncut colorant was added to water any any additives needed in the ink solution. For the comparative work in this invention only water and glycerine were added to the colorant and the total solution added total solution weight was always kept constant at 25 grams. In addition, the amount of glycerine was always held constant at 3.75 grams per 25 grams of solution so that only the amount of uncut colorant and water would vary accordingly. Therefore, the desired color value could be adjusted by simply varying the amount of water added to the ink solution.

In order to correct for varying color strengths of the different colorants, the amount of colorant added was determined by the following formula:

$$Weight = (Desired\ ink\ color\ value/Measured\ color\ value) \times 25$$

* where weight is in grams of the uncut color

The amount of water needed for the ink solution was then determined by adding the uncut colorant weight (in grams) to 3.75 (glycerine weight) and subtracting this sum from 25 grams (total solution weight). The adjusted color values varied according to the ink color being evaluated. For example, red ink solutions were adjusted to 1.2 a color value concentration, while blue was adjusted to 7.5, orange to 4.5, violet to 1.5, and yellow to 4.0 color value concentrations.

EXAMPLE 10

The viscosity of the polymeric ink solutions was measured with a Brookfield Viscometer model LVT with UL adapter at constant temperature. A 16 milliliter sample of the polymeric ink solution was poured into the UL adapter cylinder and placed in a constant temperature solution regulated at 25° C. The UL adapter was attached to the viscometer which is set at a speed of 60 RPM and the viscometer was turned on. After 30 seconds a reading was recorded. The reading off of the viscometer was converted into centipoise units by multiplying a factor of 0.1.

EXAMPLE 11

This example describes the procedure used to stain fabric with polymeric ink solutions used for comparative testing in this invention. Number 419 woven 100% cotton 2.94 combed broadcloth (from TestFabrics, Incorporated) with the dimensions measuring 133 inches by 63 inches is prewashed, dried, and ironed according to ASTMD 4265. This prepared fabric is then cut into test sections with dimensions measuring 6 inches by 7 inches (7 inches in the direction) and maintaining the face section direction using the on center 36 inch section of the fabric sheet. The polymeric ink solution (as prepared in Example 9) was applied to the test fabric above according to the following procedure. A piece of the 100% cotton woven broad cloth is loosely mounted in a 5 inch diameter embroidery hoop and centered over a 500 milliliter beaker. Using a one milliliter syringe with needle, 0.6 milliliters of the test solution was loaded. The polymeric ink solution was then deposited dropwise on the fabric in a 6 centimeter diameter circle. This was done by starting at the outside of the circle and placing the drops approximately 1 centimeter apart (working in a circular trend toward the center). Care was taken so that no drops of the ink solution were placed on top of each other. The surface of the stained area is then immediately rubbed with a plastic disposable pipet in the vertical and horizontal directions to insure a uniform deposit of colorant over the surface inside the 6 centimeter diameter circle. This stain is air dried at room temperature for four hours.

EXAMPLE 12

The procedure for laundering test fabrics stained with ink solutions for comparative data is described in this example.

Begin filling a washing machine (as designated in ASTM D4265) with 105° F. water, at setting of 12 minutes, normal wash cycle, maximum water level, and cold water rinse. Add 100 grams of Tide (by Proctor and Gamble) detergent to the washer. Allow the detergent to dissolve while the machine is filling.

Place the dried individual stained test fabric sample into a two liter beaker which has water flowing in (at about 105° F.). Allow the water to run continuously while hand-agitating the test sample for approximately 10 seconds. Empty the beaker, then place the sample fabric back into the beaker under running water. Repeat this procedure two additional times for a total of 30 seconds of rinsing. At the end of this rinse procedure the water in the beaker should be clear of all ink colorant.

The excess water is then hand squeezed from the sample and the sample is fastened to the edge of a dry towel so that the stained area extends out away from the towel (only a maximum of 10 samples should be evaluated per washing load). When the machine is filled and the agitation cycle begins, place the towel with the attached sample into the washing machine. In addition, a sufficient amount of dummy load (other fabric) is placed in the washer to provide a total of about four pounds of washing load (this includes the sample and load).

At the completion of the washing cycle, transfer the load to a dryer set at normal dry for 40 minutes. After the drying cycle, detach the test sample from the towel and smooth the fabric samples with a steam iron (setting with steam). The samples are now ready for further stain measurements.

EXAMPLE 13

This example describes the method used to evaluate and compare the residual fabric staining caused by ink solutions after the laundering procedure described in Example 11.

The test fabric was analyzed using CIELAB coordinates measured by means of a Labscan colorimeter. The colorimeter was adjusted to the following settings:
 10 degree viewer
 D65 illuminant
 ½ inch diameter viewing aperture
 UV filter The instrument was then calibrated to zero reflectance with a black tile and 100% reflectance with a white tile. Both the control (white fabric) and the stained test sample were evaluated according to the following procedure. The fabric test sample was folded lengthwise and widthwise to present a four fold thickness of fabric to be inserted into the light source of the instrument. A white tile was then placed over the fabric sample and the CIELAB data was obtained from the colorimeter The color difference ($\Delta E^*ab$) of each test sample stain was calculated according to the following equation:

$$\Delta E^*ab = \sqrt{(\Delta L^*)^2 + (\Delta a^*)^2 + (\Delta b^*)^2}$$

where delta $E^*ab$ represents the difference in color between the standard fabric and stained test fabric and the delta $L^*$, delta $a^*$, and delta $b^*$ terms are the color coordinates. The delta $L^*$ term represents the lightness of the color (stain), the delta $a^*$ term represents the redness or greenness of the stain, and the delta $b^*$ term represents the yellowness or blueness of the stain. For a further discussion see *"Principles of Color Technology"*, second Ed., F. W. Billmeyer and M. Saltzmann, pages 59 through 60 and 102 through 104.

EXAMPLE 14

This example describes the manufacture of washable marking pens which contain the polymeric colorant compositions of this invention.

The washable polymeric ink markers are typically prepared according to the following procedure. First a polymeric ink solution is made from the colorant, humectant, biocide, water, and any other additive that is needed for a specific application. The percent of colorant or additive used in this ink solution can vary according to the desired properties of final ink such as color viscosity and shelf-life.

As a typical example, an orange polymeric ink solution (as set forth in entry 1 of Table 7) is prepared by weighing out the following components on an analytical balance into a tared 200 milliliter beaker:
 30 grams of orange polymeric colorant
 15 grams of glycerine
 0.125 grams of Nuosept 95
 54 grams of deionized water The beaker is then transferred to a magnetic stirrer, a magnetic stir bar is added and the solution is stirred until homogeneous.

Once the ink solution is obtained, the washable marker is manufactured according to the following procedure. A marker nib (manufactured by Porex technologies of Fairburn, GA) was attached to the end of a pen barrel by insertion of a wire through the barrel and nib end. Approximately three milliliters of ink solution (prepared as described above) were slowly injected into the pen filter. The filter was then placed in the pen barrel and an end cap was attached to both ends of the marker. The completely manufactured marker was then placed with the nib end down for five minutes to allow the ink solution to flow throughout the nib. The marking pen is now ready for testing washability as described in Example 12.

EXAMPLE 15

This example describes the procedure for measuring the hand staining caused by ink solutions being compared and evaluated in this invention.

The hand staining test for ink solution being compared is performed according to the procedure. The subject first washes their hands with Ivory Liquid (by Proctor and Gamble) hand soap and dries them thoroughly. With a marking pen (as prepared in Example 13), mark the center of the hand palm with a ¼ inch strip of ink solution using the widest flat side of the marker nib. Repeat this procedure for a total of two additional times. The ink stain is now allowed to air dry for five minutes. The palm is then washed with water and Ivory Liquid hand soap. The hand is thoroughly dried and residual skin stain is rated on a scale of 0 to 10. The following guidelines below are used to give a numerical value to an ink hand stain:

0—No stain apparent on hand
1—Slight stain apparent, approximately 10% depth of original
2—Slight stain apparent, approximately 20% depth of original
3—Moderate stain, approximately 30% depth of original stain
4—Moderate stain, approximately 40% depth of original stain
5—Moderate to severe stain, approximately 50% depth of original
6—Moderate to severe stain, approximately 60% depth of original stain
7—Severe stain, approximately 70% depth of original stain
8—Severe stain, approximately 80% depth of original stain
9—Severe stain, approximately 90% depth of original stain
10—100% of original stain remaining

EXAMPLE 16

In a like fashion triphenylmethane polymeric colorants were prepared according to Example 1 and afterward were made into ink compositions as described in Example 9. The viscosity and stain data of the polymeric inks solutions was then determined according to Examples 10 through 15. All of these blue colorants were evaluated at a color value of 7.5 and are examples of triphenylmethane polymeric colorants containing a sulfonic acid salt as the corresponding polar group on the chromophore of this invention. These results are summarized in Table 1 below.

The results of Table 1 clearly show than an optimum molecular weight or number of ethylene oxide units are required for a practical ink viscosity and washable characteristics. The best inks results for the acetate terminated triphenylmethane polymeric colorants occurred at 12 to 20 EO units (entries 2-3) and at 12 to 40 for the EO units (entries 7-12) for the non-terminated derivatives.

Outside of this very narrow range of EO units both the viscosity and staining properties were quite unsatisfactory for these corresponding polymeric colorants. For example, the colorant in entry 1 at high molecular weight with 54 EO units (terminated with acetate) had a viscosity of about six times the acceptable value and staining about three times worst than an acceptable value. Entry 4 at a low molecular weight with 8 EO units (terminated with acetate) had very poor hand staining properties. The non-terminated EO of colorants of Table 1 also gave very similar results with the exception of slightly different molecular weight range. A high molecular weight range for these colorants as seen in entries 5 and 6 at 70 to 140 EO units, both gave unacceptably high viscosities and fabric staining results. Entry 6 was about six times worst than an acceptable value and the ink solution in entry 5 was solid at room temperature. Entry 13 at the low molecular weight with 8 EO units also gave very poor hand staining.

TABLE I

TRIPHENYLMETHANE POLYMERIC COLORANTS CONTAINING A POLAR GROUP

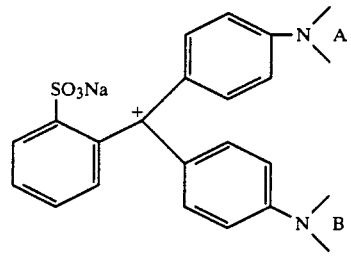

| ENTRY | A | B | V(cps) | Delta E*ab | HAND STAINING |
|---|---|---|---|---|---|
| 1 | 27 EO DA | 27 EO DA | 19.1 | 17.22 | 0 |
| 2 | 10 EO DA | 10 EO DA | 2.45 | 6.29 | 2 |
| 3 | 6 EO DA | 6 EO DA | 3.08 | 5.26 | 2 |
| 4 | 4 EO DA | 4 EO DA | 1.88 | 6.21 | 4 |
| 5 | 70 EO | 70 EO | * | 15.89 | 0 |
| 6 | 35 EO | 35 EO | 58.4 | 23.04 | 1 |
| 7 | 20 EO | 20 EO | 5.26 | 8.19 | 0 |
| 8 | 15 EO | 15 EO | 6.28 | 5.23 | 1 |
| 9 | 12 EO | 12 EO | 5.25 | 4.59 | 1 |
| 10 | 10 EO | 10 EO | 1.66 | 4.09 | 2 |
| 11 | 8 EO | 8 EO | 3.11 | 4.35 | 1.5 |
| 12 | 6 EO | 6 EO | 3.08 | 5.26 | 2 |
| 13 | 4 EO | 4 EO | 2.48 | 6.29 | 4 |

*This ink solution was only liquid on warming, it formed a solid on standing so comparative viscosity data was not possible at room temperature.

EXAMPLE 17

In a like fashion triphenylmethane polymeric colorants were prepared according to Example 2 and afterward were made into ink compositions as described in Example 9. The viscosity and stain data of the polymeric ink solutions was then determined according to Examples 10 through 15. All of these violet colorants were evaluated at a color value of 1.5 and are examples of triphenylmethane polymeric colorants which do not contain a polar group on the chromophore as described in this invention. These examples are given for comparison to illustrate the benefit of the polar group on the chromophore of the polymeric colorant. The results are summarized in Table II below.

The results of Table II clearly show the positive effect of a polar group on the chromophore of the colorant. None of the colorants in Table II gave satisfactory fabric staining results regardless of the molecular weight range or number of EO units. The number of EO units vary from 8 to about 140 in entries 1 through 6 of Table II but the fabric staining is at best about four times worst than the corresponding triphenylmethanes of Table I that contain a polar group on the chromophore of the present invention.

TABLE 2
TRIPHENYLMETHANE POLYMERIC COLORANTS WITHOUT A POLAR GROUP

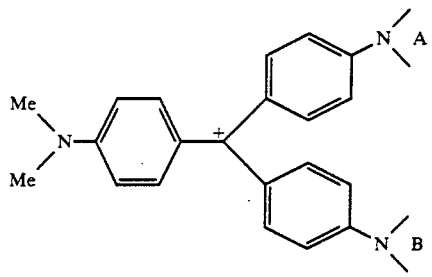

| ENTRY | A | B | V(cps) | Delta E*ab | HAND Staining |
|---|---|---|---|---|---|
| 1 | 4 EO | 4 EO | 1.52 | 30.50 | 5 |
| 2 | 5 EO | 5 EO | 1.56 | 27.91 | 7 |
| 3 | 10 EO | 10 EO | 1.94 | 14.94 | 3 |
| 4 | 20 EO | 20 EO | 1.93 | 22.04 | 2 |
| 5 | 20 EO DA | 20 EO DA | 1.85 | 19.37 | 3 |
| 6 | 70 EO | 70 EO | 2.52 | 38.01 | 1 |

EXAMPLE 18

In a like fashion cationic polymeric colorants were prepared according to Example 3 and afterward made into ink compositions as described in Example 9. The viscosity and stain data of the polymeric ink solutions was then determined according to Examples 10 through 15. All of these violet colorants were evaluated at a color value of 1.5 and are examples of cationic polymeric colorants containing a carboxylic acid salt as the corresponding polar group on the chromophore of this invention.

The results of Table 3 clearly demonstrates the utility of this invention. Both cationic colorants containing chromophores with polar groups in entries 1 and 2 gave satisfactory ink viscosities and staining results in a molecular weight range that was similar to polymeric colorants containing different polar chromophores of Table 1.

made into ink compositions as described in Example 9. The viscosity and stain data of these polymeric ink solutions was then determined according to Examples 10 through 15. All of these colorants were evaluated at a color value of 1.2 and and examples of cationic polymeric colorants which do not contain a polar group on the chromophore as described in this invention. These examples are given to further illustrate the benefit of the polar group on the chromophore of the polymeric colorant. The results are summarized in Table IV below.

The results of Table 4 clearly illustrate the positive effect of a polar group on the chromophore of the colorant. None of the colorants in Table IV gave satisfactory fabric staining results in the narrow EO unit range or molecular weight range as illustrated in Examples 17 and 18 (Tables 1 and 3).

In Example 20 the fabric staining is about six times worse than the corresponding cationic polymeric colorants of Table 3 which contain a polar group. In addition, the hand staining results for this EO unit range (20 EO) is extremely inferior to the similar class of colorants of Table 3.

TABLE 4
CATIONIC POLYMERIC COLORANTS WITHOUT POLAR GROUPS

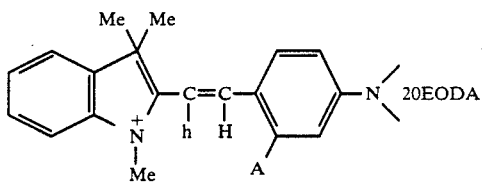

| ENTRY | A | V(cps) | Delta E*ab | HAND STAINING |
|---|---|---|---|---|
| 1 | H | 1.54 | 36.59 | 6.0 |
| 2 | Me | 1.54 | 26.59 | 5.0 |

EXAMPLE 20

In a like fashion benzothiazole diazo polymeric colorants were prepared according to Example 5 and afterward were made into ink compositions as described in Example 9. The viscosity and stain data of these polymeric ink solutions was determined according to Examples 10 through 15. All of the red colorants were evaluated at a color value of 1.2 and are examples for the comparison of benzothiazole polymeric colorants without and with a polar group on the chromophore of this

TABLE 3

| ENTRY | CATIONIC POLYMERIC COLORANTS CONTAINING A POLAR GROUP STRUCTURE | V(cps) | Delta E*ab | HAND STAINING |
|---|---|---|---|---|
| 1 | [benzothiazolium with CH2COONa, N=N-phenyl-N(10EODA)] | 1.46 | 7.92 | 0 |
| 2 | [NaOCCH2-N+(pyridinium)-N=N-phenyl-N(20EO)] | 2.99 | 10.13 | 0 |

EXAMPLE 19

In a like fashion cationic polymeric colorants were prepared according to Example 4 and afterward were invention.

The results of Table V further serve to illustrate the molecular weight range (or EO unit range) and the effect of a polar on the chromophore in this invention. Clearly, the best staining and viscosity results are for entries 1 and 8 of this table. These are heterocyclic polymeric benzothiazole diazo colorants which contain a sulfonic acid salt as the polar group and the chromophore at a similar weight range to Example 16 (Table 1), and Example 18 (Table 3) or about 20 EO units of this invention. None of the benzothiazole diazo polymeric colorants without polar groups on the chromophore gave satisfactory staining results regardless of the molecular weight or EO unit range studied in entries 2-7 and entry 9 (12-70 EO units). The fabric staining is at best about three times as bad and the hand staining is about seven times worse than the corresponding benzothiazole diazo colorants that contain a polar group on the chromophore.

EXAMPLE 21

In a like fashion additional benzothiazole diazo polymeric colorants were prepared according to Example V and afterward were made into ink compositions as described in Example 9. The viscosity and stain data of these polymeric ink solutions was determined according to Examples 10 through 15. All the red colorants were evaluated at a color value of 1.2 while the violet was evaluated at 1.5 and are further examples of benzothiazole diazo polymeric colorants containing a polar group on the chromophore of this invention.

The results of Table VI further demonstrates the utility of this invention. All of the different benzothiazole diazo polymeric colorants as shown in entries 1 through 4 gave satisfactory ink viscosities and staining results in the same general molecular weight range or EO unit range (20 EO or 20 EO DA) that similar polymeric colorants containing polar groups on the chromophore gave previously in example 16, (Table I, 18 (Table III), and 20 (Table V) regardless of the type of chromophore.

TABLE V
BENZOTHIAZOLE DIAZO POLYMERIC COLORANT COMPARISONS

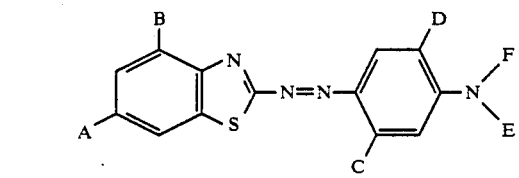

| ENTRY | A | B | C | D | EF | V(cps) | Delta E*ab | HS |
|---|---|---|---|---|---|---|---|---|
| 1 | SO₃Na | H | H | H | 20 EO | 1.96 | 4.96 | 0 |
| 2 | H | H | H | H | 20 EO | 1.78 | 13.49 | 1 |
| 3 | H | H | H | H | 20 EO | 2.74 | 15.58 | 1 |
| 4 | H | H | H | H | 35 EO | 4.62 | 23.39 | 1 |
| 5 | H | Me | OMe | OMe | 12 EO | 1.68 | 23.94 | 5 |
| 6 | OEt | H | H | H | 12 EO | 1.50 | 32.40 | 7 |
| 7 | H | Me | Cl | Me | 12 EO | 69.6 | 37.05 | 2 |
| 8 | SO₃Na | H | CF₃ | H | 20 EO | 2.23 | 7.43 | 1 |
| 9 | H | H | CF₃ | H | 20 EO | 1.96 | 17.82 | 2 |

TABLE VI

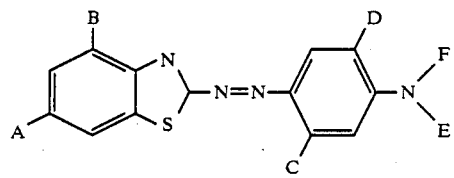

| ENTRY | A | B | C | D | EF | V(cps) | Delta E*ab | HS |
|---|---|---|---|---|---|---|---|---|
| 1 | SO₃Na | H | OMe | OMe | 20 EO DA | 2.06 | 5.50 | 0 |
| 2 | SO₃Na | H | Me | H | 20 EO | 1.77 | 8.83 | 0 |
| 3 | OMe | SO₃Na | CF₃ | H | 20 EO | 1.82 | 4.20 | 0 |
| 4 | SO₃Na | Me | CF₃ | H | 20 EO | 1.97 | 5.28 | 0 |

EXAMPLE 22

In a like fashion different additional diazo polymeric colorants were prepared according to Example V and afterward were made into ink compositions as described in Example 9. The viscosity and stain data for these different diazo polymeric ink solutions was determined according to Examples 10 through 15. All of the red colorants were evaluated at a color value of 1.2, while the orange was 4.5, and yellow was 4.0 for the corresponding ink compositions containing different polar groups on the chromophore of this invention.

The results of Table VII serves to further illustrate the scope possible for the polar group attached to the chromophore and the molecular weight range (or number of EO units) for these various types of chromophores.

Generally, the EO unit range was found to be 10-20 EO units and polar groups vary such as carboxylic acid salts, sulfonic acid salts, sulfonamides, sulfones, and nitro groups in entries 1 through 17 of Table VII.

TABLE VII

DIAZO POLYMERIC COLORANTS CONTAINING POLAR GROUPS

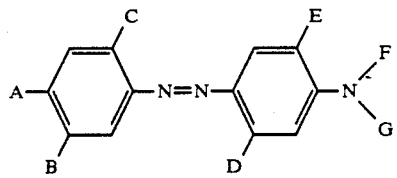

| ENTRY | A | B | C | D | E | FG | V(cps) | E*ab | HS |
|---|---|---|---|---|---|---|---|---|---|
| 1 | SO$_2$N 2 EO | H | H | Me | H | 20 EO | 5.77 | 2.14 | 0 |
| 2 | COO Na | H | H | H | H | 20 EO DA | 6.70 | 1.79 | 2 |
| 3 | SO$_2$Me | H | Cl | H | H | 10 EO DA | 2.61 | 3.44 | 0 |
| 4 | SO$_2$Me | H | Cl | H | H | 20 EO | 8.67 | 2 | |
| 5 | SO$_3$Na | H | Cl | H | H | 20 EO | 9.98 | 1.12 | 2 |
| 6 | SO$_2$NEt2 | H | OMe | H | H | 10 EO | 5.68 | 2.90 | 0 |
| 7 | SO$_2$NEt2 | H | OMe | Me | H | 10 EO | 3.72 | 6.37 | 0 |
| 8 | SO$_2$NEt2 | H | OMe | OMe | OMe | 12 EO | 4.10 | 8.31 | 0 |
| 9 | SO$_2$NEt2 | H | OMe | OMe | OMe | 20 EO DA | 20.8 | 7.83 | 0 |
| 10 | SO$_2$NEt2 | H | OMe | OMe | OMe | 20 EO DA | 20.0 | 6.48 | 0 |
| 11 | H | SO$_3$Na | SO$_3$Na | Me | H | 20 EO | 6.52 | 0.95 | 1 |
| 12 | Cl | SO$_3$Na | Me | Me | H | 20 EO | 4.10 | 8.31 | 0 |
| 13 | SO$_2$Na | Cl | Cl | OMe | OMe | 10 EO | 1.86 | 4.09 | 0 |
| 14 | SO$_3$Na | Cl | Cl | OMe | OMe | 20 EO | 2.27 | 4.15 | 0 |
| 15 | SO$_3$Na | Cl | Cl | OMe | OMe | 20 EO DA | 2.29 | 2.00 | 0 |
| 16 | SO$_3$Na | H | Cl | Me | H | 20 EO | 11.4 | 2.97 | 0 |
| 17 | H | H | NO$_2$ | OMe | H | 20 EO | 7.10 | 6.12 | 0 |

EXAMPLE 23

In a like fashion methine polymeric colorants containing a polar group on the chromophore were prepared according to Example VII and afterward were made into ink compositions as described in Example Nine. The viscosity and stain data of these methine polymeric ink solutions was determined according to Examples 10 through 15. All of the yellow colorants were evaluated at a color value of 4.0 while orange colorants were evaluated at 4.5.

The results of Table VIII further serve to illustrate the utility for yet another class of chromophores with polar groups of this invention. All the methine polymeric colorants gave satisfactory viscosity and stain results in a molecular weight range or EO unit range (about 20 EO units) that was very similar to the polymeric colorants containing different chromophores in Example 16 (Table I, Example 18 (Table III), Example 20 (Table V), Example 21 (Table VI) and Example 22 (Table 7). The polar groups shown in entries 1 through 5 include carboxylic acids, carboxylic acid amides, sulfonamides, and sulfonic acid salts.

TABLE VIII

METHINE POLYMERIC COLORANTS CONTAINING A POLAR GROUP

| ENTRY | AB | C (STRUCTURE) | V(cps) | Delta E*ab | HAND STAINING |
|---|---|---|---|---|---|
| 1 | 20 EO DA | —C=C(H)(COOH)(CN) | 5.03 | 1.12 | 0 |
| 2 | 20 EO | —C=C(H)(CONH—EO)(CN) | 6.10 | 10.98 | 0 |
| 3 | 20 EO DA | pyrazolone with SO$_2$NH—EO | 4.75 | 3.91 | 0 |

TABLE VIII-continued
METHINE POLYMERIC COLORANTS CONTAINING A POLAR GROUP

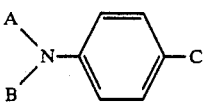

| ENTRY | AB | C (STRUCTURE) | V(cps) | Delta E*ab | HAND STAINING |
|---|---|---|---|---|---|
| 4 | 20 EO | (structure shown) | 4.43 | 1.77 | 0 |
| 5 | 20 EO DA | (structure shown) | 2.44 | 0.97 | 0 |

EXAMPLE 24

In a like fashion polymeric diazo colorants were prepared according to Example 8 and afterward were made into ink compositions as described in Example 9. The viscosity and stain data of these polymeric diazo ink compositions was determined according to Examples 10 through 15. All red colorants were evaluated at a color value of 1.2, orange at 4 5, violet at 1.5, and yellow at 4.0 and are further examples given to illustrate the effect of the polar chromophore and extended scope of this invention.

In entries 1 and 2 of Table IX of this example illustrates that an oxygen group rather than nitrogen can be used to covalently link the alkylene oxide polymer to the chromophore containing a polar group. Entries 3 through 5 of this table illustrates that divalent sulfur can also link the alkylene oxide to the polar chromophore rather than either nitrogen or oxygen. In addition, Entries 3 through 5 contain about three units of propylene oxide in the polymeric portion of the colorant illustrating that PO can also be used in conjunction with EO in the polymer backbone. All of the ink compositions of the colorants in Table IX gave satisfactory fabric staining results that were similar to other different types of polymeric colorants containing polar groups on the chromophore in Examples 16 (Table I, 18 (Table II), 20 (Table IV), 21 (Table V), 22 (Table VI), 23 (Table VII), and 24 (Table VIII) in this invention.

TABLE IX
DIAZO POLYMERIC COLORANTS CONTAINING POLAR GROUPS (WITH DIFFERENT LINKING ATOMS)

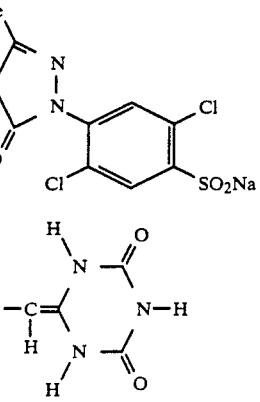

| ENTRY | A | B | C | EO/PO | V(cps) | Delta E*ab | HS |
|---|---|---|---|---|---|---|---|
| 1 | H | O | H | 30 EO | 5.4 | 5.12 | 0 |
| 2 | OH | O | H | 30 EO | 5.1 | 5.92 | 1 |
| 3 | H | SO$_2$NH | Me | 3 PO/19 EO | 60.8 | 0.99 | 0 |
| 4 | OH | SO$_2$NH | Me | 3 PO/19 EO | 2.9 | 2.56 | 0 |
| 5 | * | SO$_2$NH | Me | 3 PO/19 EO | 6.8 | 3.80 | 0 |

*The chromophore is dihydroxyphenyldiazophenyl and the linking group and the polymer is the same as in entry 3 and 4 of this table.

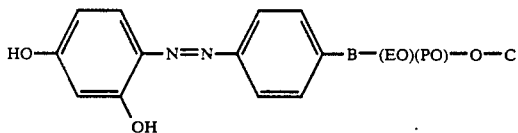

EXAMPLE 25

This example provides a direct comparison between the novel polymeric ink composition of this invention against commercially available "washable" markers.

The improved washable properties of the polymeric colorant inks of this invention is clearly demonstrated in this example by a comparison with typical existing commercial washable inks marketed under the name of "Maxi Broad Tip Markers". These commercially available washable ink markers are manufactured by Lovett of Needham, ME. The commercially available inks from "Maxi Broad Tip Markers" were evaluated along with the polymeric inks of this invention according to the following procedure. A piece of 100% woven cotton broadcloth (from TestFabrics Incorporated as described in Example 10) was placed on a 6 inch by 7 inch plastic sheet which in turn was placed on a top loading analytical balance. The balance was then zeroed and the filter was removed from the pen body of and placed lengthwise in the center of the cotton fabric swatch. The fabric and plastic holder were removed from the balance and pressure was applied to allow ink from the filter to be absorbed by the fabric substrate. The filter was rolled over an area approximately 3 inches by 4 inches located in the center of the fabric until 0.6 to 0.7 grams of ink is absorbed on the fabric (the fabric and plastic are periodically weighed on the balance). The fabric ink stain is allowed to dry at room temperature for 4 hours. This procedure was repeated so that a stain is placed on different pieces of cotton fabric with red, violet and blue inks from both "Maxi Broad Tip Markers" and polymeric inks corresponding to this invention (blue ink, Table I entry 11; red ink, Table VII entry 15; and violet ink Table VI entry 1).

The results of this table (entries 1-6) clearly demonstrate the great improvement in washability of the novel polymeric ink compositions of this invention over products being currently sold in the marketplace as washable inks. This data indicates that the fabric staining can be reduced by a factor of about ten times that of the commercial markers and the hand staining can be decreased by a factor as high as 80% as that of the commercial markers.

TABLE X
COMPARATIVE STAIN DATA FOR COMMERCIAL WASHABLE MARKERS AND THE POLYMERIC COLORANTS OF THIS INVENTION

| ENTRY | COLOR | DELTA E*ab | HAND STAINING DATA |
|---|---|---|---|
| 1 | Maxi-Blue* | 46.60 | 7.0 |
| 2 | Blue (Table I entry 11) | 4.35 | 1.5 |
| 3 | Maxi-Red* | 4.90 | 4.0 |
| 4 | Red (Table VII entry 15) | 2.00 | 0 |
| 5 | Maxi-Violet* | 51.00 | 8.0 |
| 6 | Violet (Table VI entry 1) | 5.50 | 0 |

*Maxi Broad Tip Markers are manufactured commercially as by Lovett Corporation of Needham, Maine

What is claimed is:

1. A washable, aqueous ink composition for a color marking pen which comprises an ink composition having a viscosity of from about 1.0 to about 6.0 centipoises and from about 10% to about 50% by weight of one or more polymeric colorants of the formula:

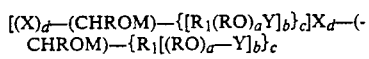

wherein:
X is a polar group selected from sulfonic acids, sulfonic acid salts, sulfonamides, sulfonates, carboxylic acids, carboxylic acid salts, carboxylic acid amides, carboxylic aldehydes, ureas, thioureas, nitro groups, hydroxy groups, polyethers, and hydroxyalkylethers;

R is unsubstituted or substituted straight or branched alkylene of 2-4 carbons, or mixtures thereof;

Y is selected from H, alkanoyl, aroyl, alkoxycarbonyl, unsubstituted or substituted carbamoyl, diacetate, methyl or $-CH_2CH(R_2)-X$;

$R_1$ is selected from nitrogen, oxygen, sulfur, or a sulfurcontaining divalent linking group;

$R_2$ is hydrogen or a lower alkyl group containing one to about five carbon atoms;

a is an integer of from 6 to about 40;

b and c are each independently selected from one or two;

d is an integer of from one to four; the product of (a) (b) (c) is an integer of from 6 to about 40;

and CHROM is a chromophore selected from nitro, nitroso, monoazo, disazo and trisazo, diarylmethane, triarylmethane, xanthane, acridine, methine, thiazole, indamine, azine, oxazine, or anthraquinone, wherein the $(RO)_a$ moiety is bonded to a carbocyclic aromatic ring of the (CHROM) through $R_1$.

2. The composition as defined in claim 1 of the formula:

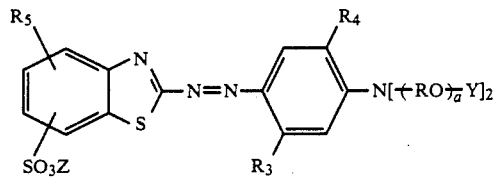

wherein $R_3$, $R_4$ or $R_5$ are selected from hydrogen, lower alkyl, lower alkoxy, halogen, trifluoroalkyl, $SO_3Z$, $SO_2N(R_6)R_7$, and $CON(R_6)R_7$; $R_6$ and $R_7$ are hydrogen, or alkyl; Z is hydrogen or a cation selected from sodium, potassium, or ammonium, and (a) is an integer of from about 5 to about 15.

3. The composition as defined in claim 1 of the formula:

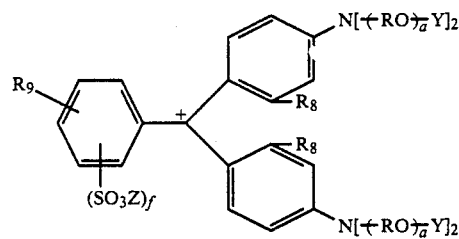

wherein $R_8$ is selected from H, lower alkyl, lower alkoxy, halogen, or trifluoroalkyl; $R_9$ is selected from alkyl, alkoxy, or halogen, and f is zero or one;

Z is H or a cation selected from Na, K, or ammonium; and (a) is an integer of from about 3 to about 10.

4. The composition as defined in claim 1 of the formula:

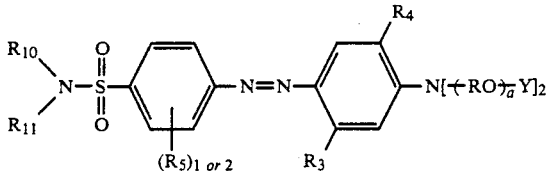

wherein $R_3$, $R_4$ and $R_5$ are selected from H, lower alkyl, lower alkoxy, halogen, trifluoroalkyl, $SO_3Z$, $SO_2N(R_6)R_7$, $CON(R_6)R_7$ wherein $R_6$ and $R_7$ are H or alkyl, and Z is H or a cation selected from Na, K, or ammonium; $R_{10}$ and $R_{11}$ are selected from hydroxyalkoxy, hydroxypolyalkyleneoxy, alkoxyalkylene, alkoxypolyalkyleneoxy or alkyl; and (a) in an integer of from about 10 to about 20.

5. The composition as defined in claim 1 of the formula:

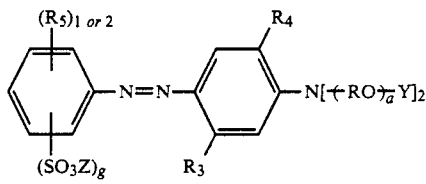

wherein $R_3$, $R_4$ and $R_5$ are selected from H, lower alkyl, lower alkoxy, halogen, trifluoroalkyl, $SO_3Z$, $SO_2N(R_6)R_7$, $CON(R_6)R_7$ wherein $R_6$ and $R_7$ are H or alkyl, and Z is H or a cation selected from Na, K or ammonium; g is an integer equal to one or two, and (a) is an integer of from about 5 to about 10.

6. The composition as defined in claim 1 of the formula:

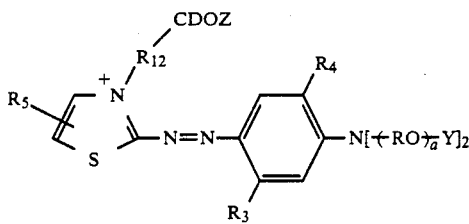

wherein $R_3$, $R_4$ and $R_5$ are selected from H, lower alkyl, lower alkoxy, halogen, trifluoroalkyl, $SO_3Z$, $SO_2N(R_6)R_7$, $CON(R_6)R_7$ wherein $R_6$ and $R_7$ are H or alkyl, and Z is H or a cation selected from Na, K, or ammonium; $R_{12}$ is an alkylene group containing from one to about five carbons, and (a) is an integer of from about 5 to about 10.

7. The composition as defined in claim 1 of the formula:

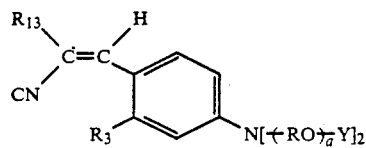

wherein $R_3$ is selected from H, lower alkyl, lower alkoxy, halogen, trifluoroalkyl, $SO_3Z$, $SO_2N(R_6)R_7$, $CON(R_6)R_7$ wherein $R_6$ and $R_7$ are H or alkyl, and Z is H or a cation selected from Na, K, or ammonium; and $R_{13}$ is cyano, $R_{14}NHCO$, or COOZ, and $R_{14}$ is selected from hydrogen, lower alkyl containing one to five carbons, hydroxyalkylene, hydroxyl-polyalkyleneoxy, alkoxyalkylene, or alkoxypolyalkyleneoxy.

8. The composition as defined in claim 1 wherein CHROM is:

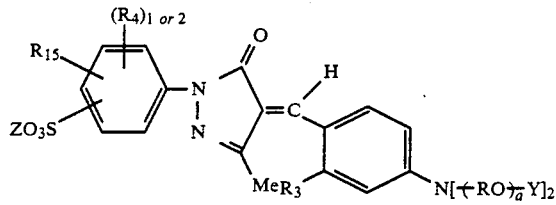

wherein $R_{15}$ is COOZ; $R_3$ and $R_4$ are selected from H, lower alkyl, lower alkoxy, halogen, trifluoroalkyl, $SO_3Z$, $SO_2N(R_6)R_7$, $CON(R_6)R_7$ wherein $R_6$ and $R_7$ are H or alkyl, and Z is H or a cation selected from Na, K, or ammonium; and (a) is an integer of from about 5 to about 10.

9. The composition as defined in claim 1 of the formula:

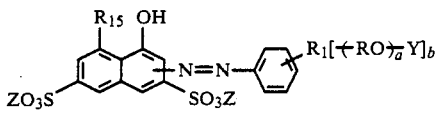

wherein Z is H or a cation selected from Na, K, or ammonium; (a) is an integer of from about 5 to about 10. and $R_{16}$ is H or OH.

10. The washable ink composition of claim 1 wherein the polymeric colorant containing a polar chromophore has incorporated therein from about 40 percent to about 85 percent by weight of poly(alkylene oxide).

11. The washable ink composition of claim 1 wherein the polymeric colorant in the ink composition has incorporated therein from about 5 percent by weight to about 40 percent by weight of poly(alkylene oxide) units.

12. The washable ink composition of claim 1 wherein the poly(alkylene oxide) is derived from ethylene oxide.

13. The washable, aqueous ink composition for a color pen of claim 1 which comprises nib, felt, wick, and recording type markers.

14. The washable ink composition of claim 1 containing from about 5 percent to about 20 percent by weight of humectant.

15. The washable ink composition of claim 1 containing from about 0.02 percent to about 0.5 percent by weight of biocide.

16. The washable ink composition of claim 1 containing from about 0.1 percent to about 0.5 percent by weight of chelating agent.

17. The washable ink composition of claim 1 wherein the pH is maintained from 6.0 to about 7.5.

18. The washable ink composition of claim 1 wherein the residual colorant fabric staining is rated at a numerical value of zero to ten delta E*ab units.

19. The washable ink composition of claim 1 wherein the residual colorant skin staining is rated at zero to about 1.5 units.

20. The washable ink composition of claim 1 wherein Y is selected from H, diacetate and methyl.

* * * * *

UNITED STATES PATENT AND TRADEMARK OFFICE
CERTIFICATE OF CORRECTION

PATENT NO. : 5,043,013
DATED : August 27, 1991
INVENTOR(S) : Edward W. Kluger, Patrick D. Moore and Judy A. Wagner It is certified that error appears in the above-identified patent and that said Letters Patent is hereby corrected as shown below:

Column 21, line 61 of the structure, delete:

$$[(X)_d-(CHROM)-\{[R_1(RO)_aY]_b\}_c]$$

Signed and Sealed this

Sixth Day of June, 1995

*Attest:*

BRUCE LEHMAN

*Attesting Officer*     *Commissioner of Patents and Trademarks*